US011893654B2

(12) United States Patent
Kurumanghat et al.

(10) Patent No.: US 11,893,654 B2
(45) Date of Patent: Feb. 6, 2024

(54) OPTIMIZATION OF DEPTH AND SHADOW PASS RENDERING IN TILE BASED ARCHITECTURES

(71) Applicant: QUALCOMM Incorporated, San Diego, CA (US)

(72) Inventors: Sreyas Kurumanghat, Bangalore (IN); Kalyan Kumar Bhiravabhatla, Bengaluru (IN); Andrew Evan Gruber, Arlington, MA (US); Tao Wang, Sunnyvale, CA (US); Baoguang Yang, Fremont, CA (US); Pavan Kumar Akkaraju, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 120 days.

(21) Appl. No.: 17/373,704

(22) Filed: Jul. 12, 2021

(65) Prior Publication Data

US 2023/0017522 A1    Jan. 19, 2023

(51) Int. Cl.
*G06T 1/20* (2006.01)
*G06T 1/60* (2006.01)
*G06T 15/40* (2011.01)

(52) U.S. Cl.
CPC ............... *G06T 1/20* (2013.01); *G06T 1/60* (2013.01); *G06T 15/405* (2013.01)

(58) Field of Classification Search
None
See application file for complete search history.

(56) References Cited

U.S. PATENT DOCUMENTS

| | | | |
|---|---|---|---|
| 2012/0280998 A1 | 11/2012 | Nordlund | |
| 2017/0148203 A1* | 5/2017 | Hakura | G06T 17/20 |
| 2017/0345207 A1* | 11/2017 | Seiler | G06T 1/20 |
| 2017/0352182 A1 | 12/2017 | Wang et al. | |
| 2019/0172213 A1 | 6/2019 | Wicks et al. | |
| 2019/0197658 A1* | 6/2019 | Jasoliya | G06T 15/00 |

(Continued)

FOREIGN PATENT DOCUMENTS

| | | |
|---|---|---|
| EP | 3382652 A1 | 10/2018 |
| WO | WO-2018118203 A1 | 6/2018 |

OTHER PUBLICATIONS

International Search Report and Written Opinion—PCT/US2022/033546—ISA/EPO—dated Nov. 21, 2022.

*Primary Examiner* — James A Thompson
*Assistant Examiner* — Kim Thanh T Tran
(74) *Attorney, Agent, or Firm* — QUALCOMM Incorporated

(57) ABSTRACT

The present disclosure relates to methods and devices for graphics processing including an apparatus, e.g., a GPU. The apparatus may configure a portion of a GPU to include at least one depth processing block, the at least one depth processing block being associated with at least one depth buffer. The apparatus may also identify one or more depth passes of each of a plurality of graphics workloads, the plurality of graphics workloads being associated with a plurality of frames. Further, the apparatus may process each of the one or more depth passes in the portion of the GPU including the at least one depth processing block, each of the one or more depth passes being processed by the at least one depth processing block, the one or more depth passes being associated with the at least one depth buffer.

23 Claims, 8 Drawing Sheets

(56) References Cited

U.S. PATENT DOCUMENTS

| | | | |
|---|---|---|---|
| 2020/0098078 A1* | 3/2020 | Bujewski | G06T 1/20 |
| 2020/0098165 A1* | 3/2020 | Gruber | G06T 15/005 |
| 2020/0098169 A1* | 3/2020 | Wu | G06T 15/005 |
| 2020/0294301 A1* | 9/2020 | Surti | G06T 17/20 |

* cited by examiner

OPTIMIZATION OF DEPTH AND SHADOW PASS RENDERING IN TILE BASED ARCHITECTURES

TECHNICAL FIELD

The present disclosure relates generally to processing systems and, more particularly, to one or more techniques for graphics processing.

INTRODUCTION

Computing devices often perform graphics and/or display processing (e.g., utilizing a graphics processing unit (GPU), a central processing unit (CPU), a display processor, etc.) to render and display visual content. Such computing devices may include, for example, computer workstations, mobile phones such as smartphones, embedded systems, personal computers, tablet computers, and video game consoles. GPUs are configured to execute a graphics processing pipeline that includes one or more processing stages, which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A display processor is configured to convert digital information received from a CPU to analog values and may issue commands to a display panel for displaying the visual content. A device that provides content for visual presentation on a display may utilize a GPU and/or a display processor.

A GPU of a device may be configured to perform the processes in a graphics processing pipeline. Further, a display processor or display processing unit (DPU) may be configured to perform the processes of display processing. However, with the advent of wireless communication and smaller, handheld devices, there has developed an increased need for improved graphics or display processing.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a graphics processing unit (GPU) or any apparatus that can perform graphics processing. The apparatus may configure a portion of a graphics processing unit (GPU) to include at least one depth processing block, the at least one depth processing block being associated with at least one depth buffer, the portion of the GPU corresponding to at least one of a binning pipe or a geometry pipe. The apparatus may also receive each of a plurality of graphics workloads, where one or more depth passes of each of the plurality of graphics workloads are identified after each of the plurality of graphics workloads is received. Additionally, the apparatus may identify one or more depth passes of each of a plurality of graphics workloads, the plurality of graphics workloads being associated with a plurality of frames. The apparatus may also generate the at least one depth buffer, where the generation of the at least one depth buffer is associated with each of the one or more depth passes. The apparatus may also process each of the one or more depth passes in the portion of the GPU including the at least one depth processing block, each of the one or more depth passes being processed by the at least one depth processing block, the one or more depth passes being associated with the at least one depth buffer. Moreover, the apparatus may transmit, upon processing each of the one or more depth passes, each of the one or more depth passes to a render GPU pipe or a rendering pipe of the GPU. The apparatus may also combine, upon transmitting each of the one or more depth passes, each of the one or more depth passes with at least one other GPU operation. The apparatus may also generate, upon combining each of the one or more depth passes with the at least one other GPU operation, a final frame or a final render target based on the one or more depth passes and the at least one other GPU operation.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
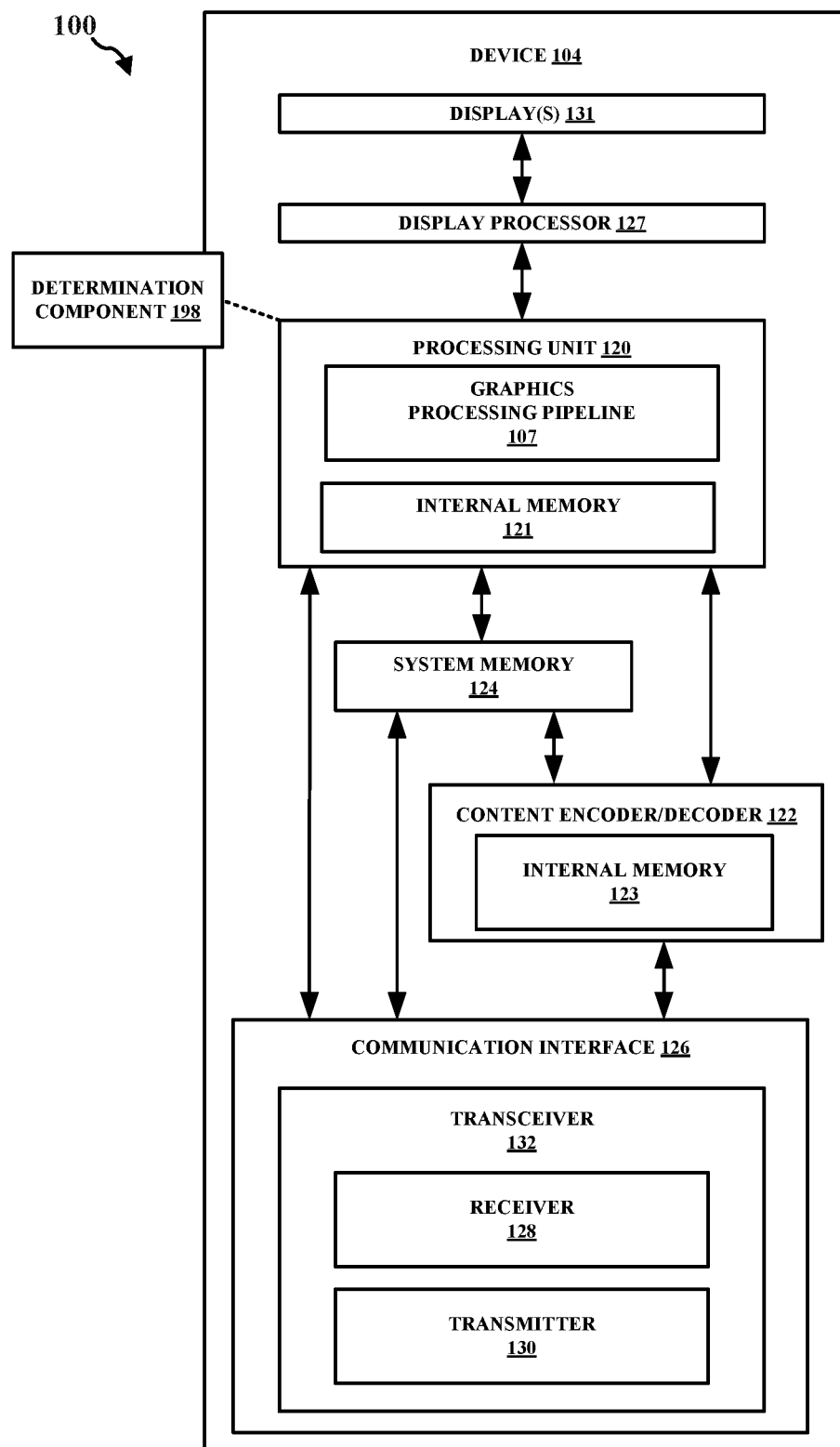
FIG. 1 is a block diagram that illustrates an example content generation system in accordance with one or more techniques of this disclosure.

In some aspects of graphics processing, graphics workloads may rely on depth passes in order to pre-calculate the depth information in a scene based on the scene geometry. These depth passes may process a geometry portion of the information and may not have any pixel shading associated with the information. In subsequent passes, the depth information that is captured may be used to render the scene, thereby allowing the workload for the pixel shading to be reduced. In some aspects of graphics processing, binning architectures may utilize a binning pass to calculate the portion of a frame into which certain geometry falls. Additionally, binning architectures may perform a render pass on different bins in the scene. In some instances, the architecture may include a separate pipe to perform the binning process. This may allow the binning for future surfaces to be performed concurrently during the rendering of a surface. Also, the binning pipe may perform geometry processing before it is used in the render pass. In some GPU architectures, depth passes may be forced to be run in direct mode, as all the depth information may not be captured in the binning stage. Further, the binning pipe may end at the low resolution Z pass (LRZ) stage which signals into which bin a certain primitive may fall. However, if the geometry processing in the binning pipe can be used to compute the depth information, the depth passes may also be moved to the binning pipe, thereby allowing it to be run concurrently with the pixel computations. For instance, if the depth pass is routed through the binning pipe, the depth pass may be run concurrently along with pixel shading, which may improve the overall GPU performance. Aspects of the present disclosure may extend the binning pipe geometry processing to calculate detailed depth information. Aspects of the present disclosure may also move depth passes to the binning pipe, thereby allowing it to be run concurrently with pixel computations. For example, aspects of the present disclosure may route the depth pass through the binning pipe, such that the depth pass may be processed concurrently along with pixel shading. More specifically, aspects of the present disclosure may extend the binning pipe after the LRZ to the render backend (RB). For instance, aspects of the present disclosure may extend the binning pipe geometry processing such that depth/shadow passes may be run concurrently through the binning pipe, which may thereby improve the GPU performance.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In general, this disclosure describes techniques for having a graphics processing pipeline in a single device or multiple devices, improving the rendering of graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120, a content encoder/decoder 122, and a system memory 124. In some aspects, the device 104 can include a number of optional components, e.g., a communication interface 126, a transceiver 132, a receiver 128, a transmitter 130, a display processor 127, and one or more displays 131. Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this can be referred to as split-rendering.

The processing unit 120 may include an internal memory 121. The processing unit 120 may be configured to perform graphics processing, such as in a graphics processing pipeline 107. The content encoder/decoder 122 may include an internal memory 123. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 and the content encoder/decoder 122 may be communicatively coupled to the system memory 124 over a bus. In some examples, the processing unit 120 and the content encoder/decoder 122 may be communicatively coupled to each other over the bus or a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 can include an optional communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the processing unit 120 may include a determination component 198 configured to configure a portion of a graphics processing unit (GPU) to include at least one depth processing block, the at least one depth processing block being associated with at least one depth buffer, the portion of the GPU corresponding to at least one of a binning pipe or a geometry pipe. The determination component 198 may also be configured to receive each of a plurality of graphics workloads, where one or more depth passes of each of the plurality of graphics workloads are identified after each of the plurality of graphics workloads is received. The determination component 198 may also be configured to identify one or more depth passes of each of a plurality of graphics workloads, the plurality of graphics workloads being associated with a plurality of frames. The determination component 198 may also be configured to generate the at least one depth buffer, where the generation of the at least one depth buffer is associated with each of the one or more depth passes. The determination component 198 may also be configured to process each of the one or more depth passes in the portion of the GPU including the at least one depth processing block, each of the one or more depth passes being processed by the at least one depth processing block, the one or more depth passes being associated with the at least one depth buffer. The determination component 198 may also be configured to transmit, upon processing each of the one or more depth passes, each of the one or more depth passes to a render GPU pipe or a rendering pipe of the GPU. The determination component 198 may also be configured to combine, upon transmitting each of the one or more depth passes, each of the one or more depth passes with at least one other GPU operation. The determination component 198 may also be configured to generate, upon combining each of the one or more depth passes with the at least one other GPU operation, a final frame or a final render target based on the one or more depth passes and the at least one other GPU operation. Although the following description may be focused on graphics processing, the concepts described herein may be applicable to other similar processing techniques.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, can be performed using other components (e.g., a CPU), consistent with disclosed embodiments.

GPUs can process multiple types of data or data packets in a GPU pipeline. For instance, in some aspects, a GPU can process two types of data or data packets, e.g., context register packets and draw call data. A context register packet can be a set of global state information, e.g., information regarding a global register, shading program, or constant data, which can regulate how a graphics context will be processed. For example, context register packets can include information regarding a color format. In some aspects of context register packets, there can be a bit that indicates which workload belongs to a context register. Also, there can be multiple functions or programming running at the same time and/or in parallel. For example, functions or programming can describe a certain operation, e.g., the color mode or color format. Accordingly, a context register can define multiple states of a GPU.

Context states can be utilized to determine how an individual processing unit functions, e.g., a vertex fetcher (VFD), a vertex shader (VS), a shader processor, or a geometry processor, and/or in what mode the processing unit functions. In order to do so, GPUs can use context registers and programming data. In some aspects, a GPU can generate a workload, e.g., a vertex or pixel workload, in the pipeline based on the context register definition of a mode or state. Certain processing units, e.g., a VFD, can use these states to determine certain functions, e.g., how a vertex is assembled. As these modes or states can change, GPUs may need to change the corresponding context. Additionally, the workload that corresponds to the mode or state may follow the changing mode or state.

Figure 2:
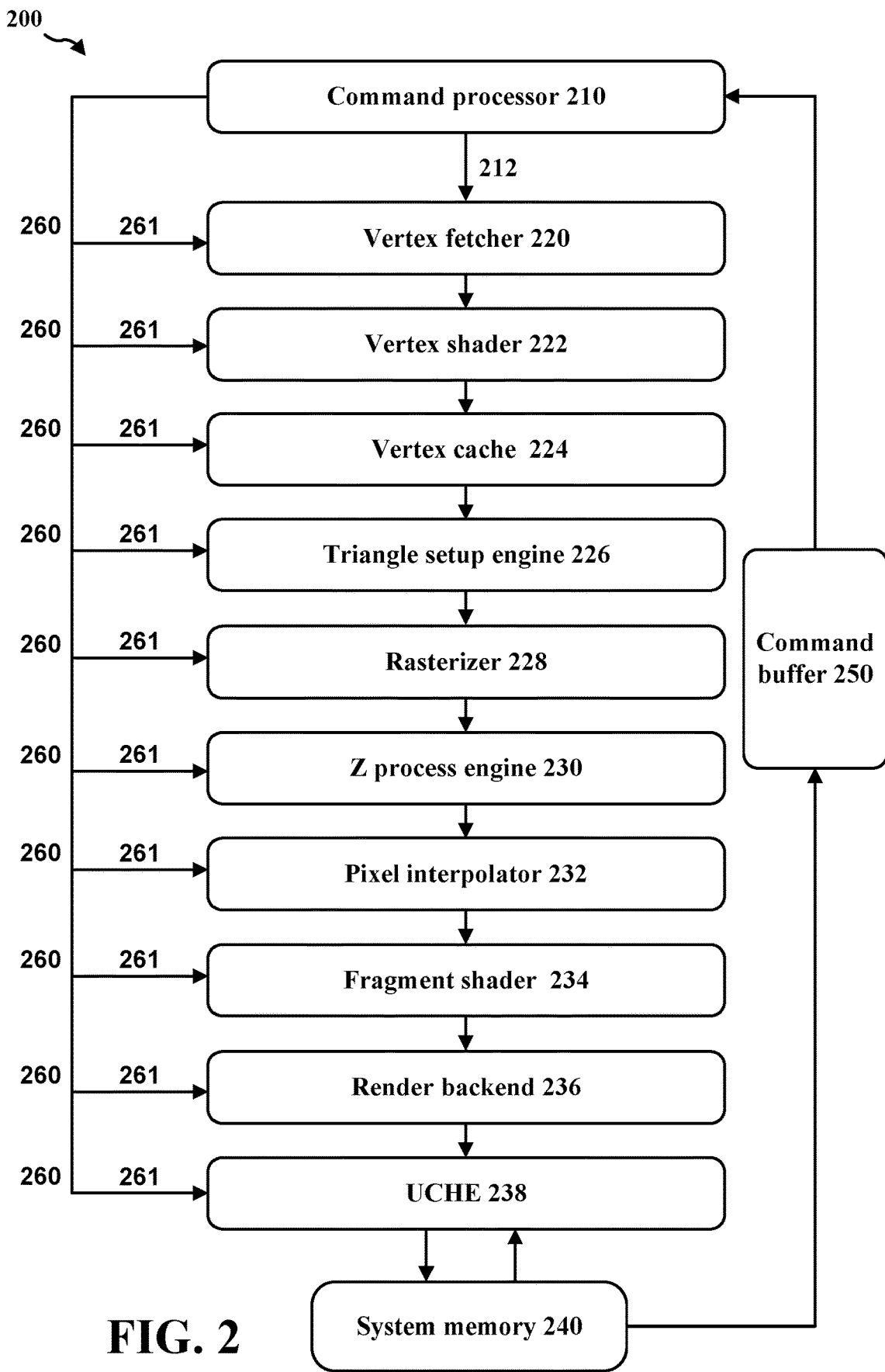
FIG. 2 illustrates an example GPU in accordance with one or more techniques of this disclosure.

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, level 2 (L2) cache (UCHE) 238, and system memory 240. Although FIG. 2 displays that GPU 200 includes processing units 220-238, GPU 200 can include a number of additional processing units. Additionally, processing units 220-238 are merely an example and any combination or order of processing units can be used by GPUs according to the present disclosure. GPU 200 also includes command buffer 250, context register packets 260, and context states 261.

As shown in FIG. 2, a GPU can utilize a CP, e.g., CP 210, or hardware accelerator to parse a command buffer into context register packets, e.g., context register packets 260, and/or draw call data packets, e.g., draw call packets 212. The CP 210 can then send the context register packets 260 or draw call data packets 212 through separate paths to the processing units or blocks in the GPU. Further, the command buffer 250 can alternate different states of context registers and draw calls. For example, a command buffer can be structured in the following manner: context register of context N, draw call(s) of context N, context register of context N+1, and draw call(s) of context N+1.

GPUs can render images in a variety of different ways. In some instances, GPUs can render an image using rendering and/or tiled rendering. In tiled rendering GPUs, an image can be divided or separated into different sections or tiles. After the division of the image, each section or tile can be rendered separately. Tiled rendering GPUs can divide computer graphics images into a grid format, such that each portion of the grid, i.e., a tile, is separately rendered. In some aspects, during a binning pass, an image can be divided into different bins or tiles. In some aspects, during the binning pass, a visibility stream can be constructed where visible primitives or draw calls can be identified. In contrast to tiled rendering, direct rendering does not divide the frame into smaller bins or tiles. Rather, in direct rendering, the entire frame is rendered at a single time. Additionally, some types of GPUs can allow for both tiled rendering and direct rendering.

In some aspects, GPUs can apply the drawing or rendering process to different bins or tiles. For instance, a GPU can render to one bin, and perform all of the draws for the primitives or pixels in the bin. During the process of rendering to a bin, the render targets can be located in the GMEM. In some instances, after rendering to one bin, the content of the render targets can be moved to a system memory and the GMEM can be freed for rendering the next bin. Additionally, a GPU can render to another bin, and perform the draws for the primitives or pixels in that bin. Therefore, in some aspects, there might be a small number of bins, e.g., four bins, that cover all of the draws in one surface. Further, GPUs can cycle through all of the draws in one bin, but perform the draws for the draw calls that are visible, i.e., draw calls that include visible geometry. In some aspects, a visibility stream can be generated, e.g., in a binning pass, to determine the visibility information of each primitive in an image or scene. For instance, this visibility stream can identify whether a certain primitive is visible or not. In some aspects, this information can be used to remove primitives that are not visible, e.g., in the rendering pass. Also, at least some of the primitives that are identified as visible can be rendered in the rendering pass.

In some aspects of tiled rendering, there can be multiple processing phases or passes. For instance, the rendering can be performed in two passes, e.g., a visibility or bin-visibility pass and a rendering or bin-rendering pass. During a visibility pass, a GPU can input a rendering workload, record the positions of the primitives or triangles, and then determine which primitives or triangles fall into which bin or area. In some aspects of a visibility pass, GPUs can also identify or mark the visibility of each primitive or triangle in a visibility stream. During a rendering pass, a GPU can input the visibility stream and process one bin or area at a time. In some aspects, the visibility stream can be analyzed to determine which primitives, or vertices of primitives, are visible or not visible. As such, the primitives, or vertices of primitives, that are visible may be processed. By doing so, GPUs can reduce the unnecessary workload of processing or rendering primitives or triangles that are not visible.

In some aspects, during a visibility pass, certain types of primitive geometry, e.g., position-only geometry, may be processed. Additionally, depending on the position or location of the primitives or triangles, the primitives may be sorted into different bins or areas. In some instances, sorting primitives or triangles into different bins may be performed by determining visibility information for these primitives or triangles. For example, GPUs may determine or write visibility information of each primitive in each bin or area, e.g., in a system memory. This visibility information can be used to determine or generate a visibility stream. In a rendering pass, the primitives in each bin can be rendered separately. In these instances, the visibility stream can be fetched from memory used to drop primitives which are not visible for that bin.

Some aspects of GPUs or GPU architectures can provide a number of different options for rendering, e.g., software rendering and hardware rendering. In software rendering, a driver or CPU can replicate an entire frame geometry by processing each view one time. Additionally, some different states may be changed depending on the view. As such, in software rendering, the software can replicate the entire workload by changing some states that may be utilized to render for each viewpoint in an image. In certain aspects, as GPUs may be submitting the same workload multiple times for each viewpoint in an image, there may be an increased amount of overhead. In hardware rendering, the hardware or GPU may be responsible for replicating or processing the geometry for each viewpoint in an image. Accordingly, the hardware can manage the replication or processing of the primitives or triangles for each viewpoint in an image.

Figure 3:
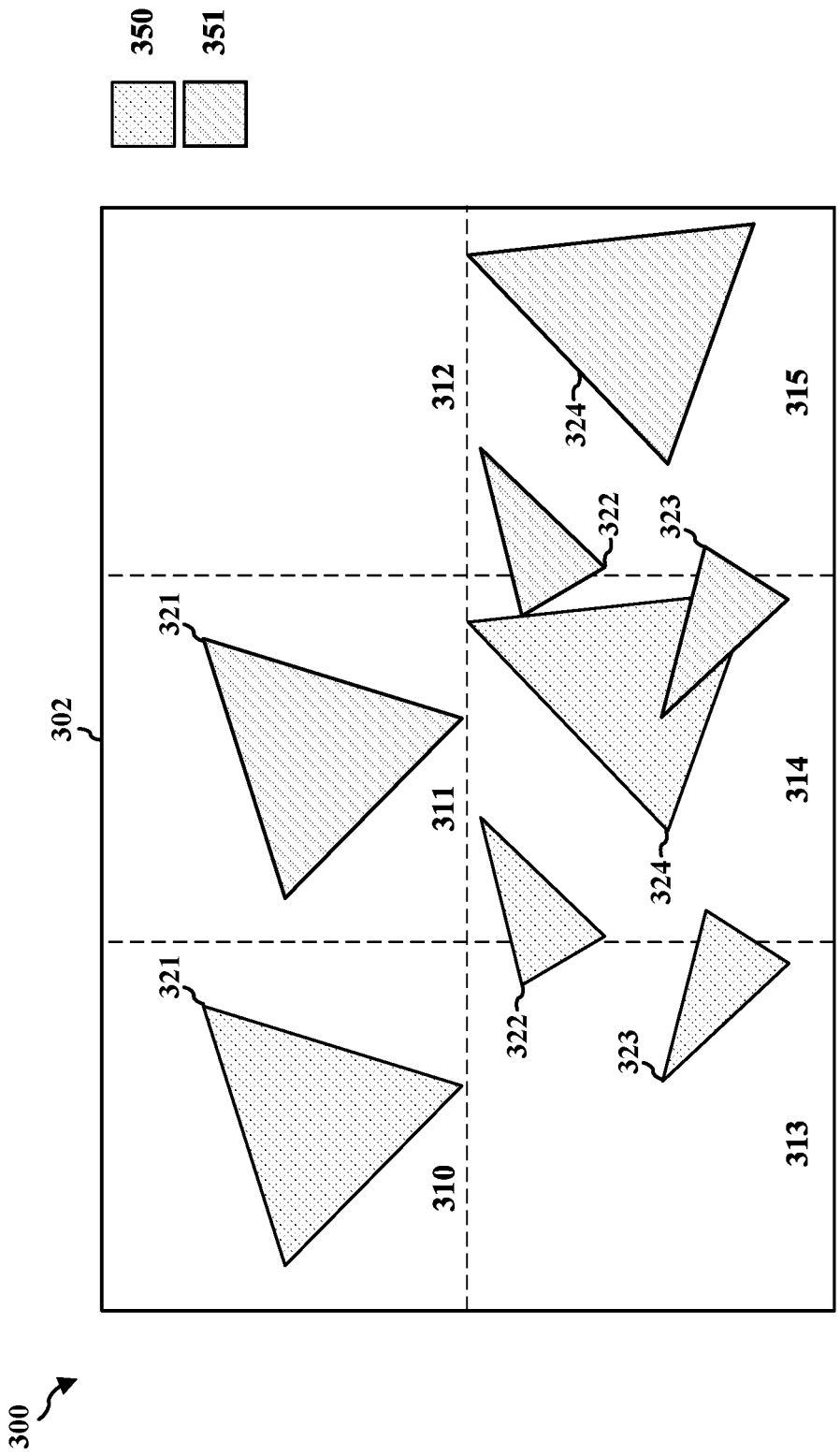
FIG. 3 illustrates an example image or surface in accordance with one or more techniques of this disclosure.

FIG. 3 illustrates image or surface 300, including multiple primitives divided into multiple bins. As shown in FIG. 3, image or surface 300 includes area 302, which includes primitives 321, 322, 323, and 324. The primitives 321, 322, 323, and 324 are divided or placed into different bins, e.g., bins 310, 311, 312, 313, 314, and 315. FIG. 3 illustrates an example of tiled rendering using multiple viewpoints for the primitives 321-324. For instance, primitives 321-324 are in first viewpoint 350 and second viewpoint 351. As such, the GPU processing or rendering the image or surface 300 including area 302 can utilize multiple viewpoints or multi-view rendering.

As indicated herein, GPUs or graphics processor units can use a tiled rendering architecture to reduce power consumption or save memory bandwidth. As further stated above, this rendering method can divide the scene into multiple bins, as well as include a visibility pass that identifies the triangles that are visible in each bin. Thus, in tiled rendering, a full screen can be divided into multiple bins or tiles. The scene can then be rendered multiple times, e.g., one or more times for each bin. In aspects of graphics rendering, some graphics applications may render to a single target, i.e., a render target, one or more times. For instance, in graphics rendering, a frame buffer on a system memory may be updated multiple times. The frame buffer can be a portion of memory or random access memory (RAM), e.g., containing a bitmap or storage, to help store display data for a GPU. The frame buffer can also be a memory buffer containing a complete frame of data. Additionally, the frame buffer can be a logic buffer. In some aspects, updating the frame buffer can be performed in bin or tile rendering, where, as discussed above, a surface is divided into multiple bins or tiles and then each bin or tile can be separately rendered. Further, in tiled rendering, the frame buffer can be partitioned into multiple bins or tiles.

Some aspects of graphics processing may utilize different types of GPU architectures, such as GPU architectures with an increased amount of concurrency. For example, some types of GPU architectures may include asynchronous compute and decoupling geometry in order to maximize a resource utilization. GPU workloads may also have varying degrees of complexity, where some workloads may be demanding on resources and some workloads may be less demanding. For instance, while gaming workloads may completely load the GPU and memory resources, graphical user interface (GUI) workloads may be less demanding on the GPU and memory resources. Further, some types of GPU usage models may provide both performance and power benefits. For example, a GPU usage model including an asynchronous, small GPU pipe sharing key resources that has the ability to run graphics workloads concurrently at a lower priority may provide performance and power benefits.

In some aspects of graphics processing, graphics workloads may rely on depth passes in order to pre-calculate the depth information in a scene based on the scene geometry. These depth passes may process a geometry portion of the information and may not have any pixel shading associated with the information. In subsequent passes, the depth information that is captured may be used to render the scene, thereby allowing the workload for the pixel shading to be reduced.

In some graphics workloads, depth passes may include computations that are primitive heavy and/or quad heavy. For instance, there may not be much pixel computation after the initial depth calculation. Table 1 below depicts a workload profile for a given depth pass or shadow pass. More specifically, Table 1 displays a shadow pass profile including percentages for a shadow pass time, shadow pass pixel shaders, a shadow pass low resolution Z (LRZ), shadow pass primitives, and a shadow pass streaming processor (SP) utilization.

TABLE 1

| | Shadow/depth pass profile | | | | |
|---|---|---|---|---|---|
| Benchmark | Shadow Pass Time | Shadow Pass Pixel Shaders | Shadow Pass LRZ | Shadow Pass Prims | Shadow Pass SP Utilization (Avg) |
| Application 1 | 18% | 4% | 65% | 67% | 7.8% |
| Application 2 | 8.8% | 23% | 15% | 39% | 8.2% |
| Application 3 | 1.5% | 0% | 4% | 12% | 7.3% |
| Application 4 | 4.9% | 0% | 10% | 19% | 3% |
| Application 5 | 6.5% | 10% | 20% | 49% | 3% |

As shown in Table 1 above, shadow passes may contribute to a significant portion of a frame time. More specifically, a significant portion of a primitive workload may correspond to these phases. Also, the streaming processor (SP) efficiency may be low in these shadow passes. There may also be more primitives performing depth-only geometry. Further, there may be a fairly simple shaders-to-output depth information ratio or kill pixels. These surfaces may also work mostly in direct mode.

In some aspects of graphics processing, binning architectures may utilize a binning pass to calculate the portion of a frame into which certain geometry falls. Additionally, binning architectures may perform a render pass on different bins in a scene. In some instances, the architecture may include a separate pipe to perform the binning process. This may allow the binning for future surfaces to be performed concurrently during the rendering of a surface.

Figure 4:
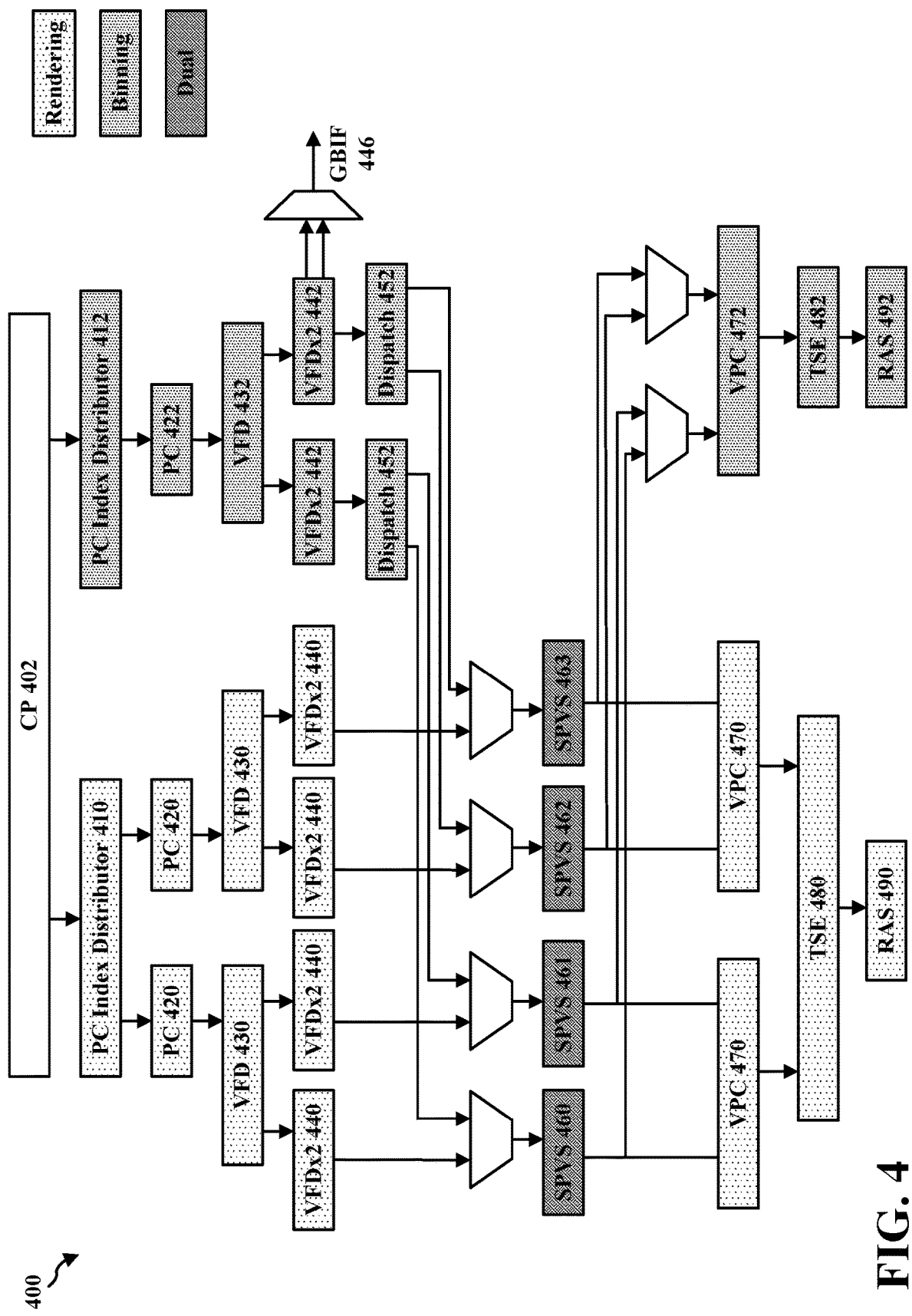
FIG. 4 is a diagram illustrating an example GPU architecture in accordance with one or more techniques of this disclosure.

FIG. 4 is a diagram 400 illustrating an example GPU architecture. As shown in FIG. 4, diagram 400 includes a number of components in a binning pipe and a rendering pipe of a GPU architecture. For instance, the binning pipe includes a primitive controller (PC) index distributor 410, PC 420, vertex fetcher and decoder (VFD) 430, VFDx2 440, vertex cache (VPC) 470, triangle setup engine (TSE) 480, and rasterizer (RAS) 490. The rendering pipe includes PC index distributor 412, PC 422, VFD 432, VFDx2 442, dispatch component 452, VPC 472, TSE 482, and RAS 492. Additionally, some components in the GPU architecture may correspond to a dual mode, such that they are utilized by both the binning pipe and the rendering pipe. For example, shader processor (SP) vertex shader (VS) 460-463 may correspond to a dual mode. As further shown in FIG. 4, the GPU architecture may include a general buffer interface (GBIF) 446, e.g., connected to VFDx2 442.

As depicted in FIG. 4, the binning pipe may perform geometry processing before it is used in the render pass. In some GPU architectures, depth passes may be forced to be run in direct mode, as all the depth information may not be captured in the binning stage. Further, the binning pipe may end at the low resolution Z pass (LRZ) stage which signals into which bin a certain primitive may fall. However, if the geometry processing in the binning pipe can be used to compute the depth information, the depth passes may also be moved to the binning pipe, thereby allowing it to be run concurrently with the pixel computations. For instance, if the depth pass is routed through the binning pipe, the depth pass may be run concurrently along with pixel shading, which may improve the overall GPU performance.

Based on the above, it may be beneficial to extend the binning pipe geometry processing to calculate detailed depth information. Specifically, it may be beneficial to extend the binning pipe after the LRZ to the render backend (RB) where the per pixel depth information is computed. For instance, by extending the binning pipe geometry processing, some of the depth/shadow passes may be processed concurrently through the binning pipe, which may improve the GPU performance.

Aspects of the present disclosure may extend the binning pipe geometry processing to calculate detailed depth information. Aspects of the present disclosure may also move depth passes to the binning pipe, thereby allowing it to be run concurrently with pixel computations. For example, aspects of the present disclosure may route the depth pass through the binning pipe, such that the depth pass may be processed concurrently along with pixel shading. More specifically, aspects of the present disclosure may extend the binning pipe after the LRZ to the render backend (RB). For instance, aspects of the present disclosure may extend the binning pipe geometry processing such that depth/shadow passes may be run concurrently through the binning pipe, which may thereby improve the GPU performance.

As mentioned previously, in some aspects, the binning pipe may perform geometry processing before it is used in the render pass. In this manner, the detailed depth information may not be calculated during binning, as the binning may end before the RB block which performs the detailed depth calculation. For instance, the depth/shadow passes may be performed in direct mode rather than in the binning mode. However, aspects of the present disclosure may utilize the geometry processing in the binning pipe to compute the detailed depth information, such that the depth passes may be moved into the binning pipe. Accordingly, aspects of the present disclosure may run the depth passes concurrently during the pixel computations. As aspects of the present disclosure may run the depth pass through the binning pipe, the GPU performance/processing speed may be improved as the depth pass are processed concurrently with pixel shading.

In some instances, aspects of the present disclosure may extend the binning pipe after the LRZ to the RB stage, e.g., where the per pixel depth is computed. For instance, aspects of the present disclosure may do so in order to compute the detailed depth information. Also, there may be some pixel calculations in order to compute this detailed depth information. As such, aspects of the present disclosure may extend the binning pipe further by adding an RB or SP in the binning pipe. Moreover, aspects of the present disclosure may share these blocks, e.g., RB or SP, that are present in the render pipe, such as in a dual mode. In aspects of the present disclosure that share the RB and SP blocks between the binning and render pipes, this may be accomplished without slowing down the rendering process. Further, during shadow passes, aspects of the present disclosure may not utilize shaders during a pixel computation.

Based on the above, aspects of the present disclosure may utilize GPU architecture to include a streaming processor that is shared between both the render pipe and the binning pipe. Aspects of the present disclosure may also add an RB to the binning pipe to perform the pixel level depth interpolation. By doing so, aspects of the present disclosure may allow the depth pass to run through the binning pipe concurrently with pixel shading. As such, aspects of the present disclosure may thereby improve the GPU performance or processing speed. Aspects of the present disclosure may also configure a binning pipe of the GPU to include a per-sample depth interpolation and test block (detailed Z). Moreover, the per-sample depth interpolation and test block may be associated with a depth buffer (Z-buffer), such that the binning pipe of the GPU may be configured to include the depth buffer or Z-buffer.

Figure 5:
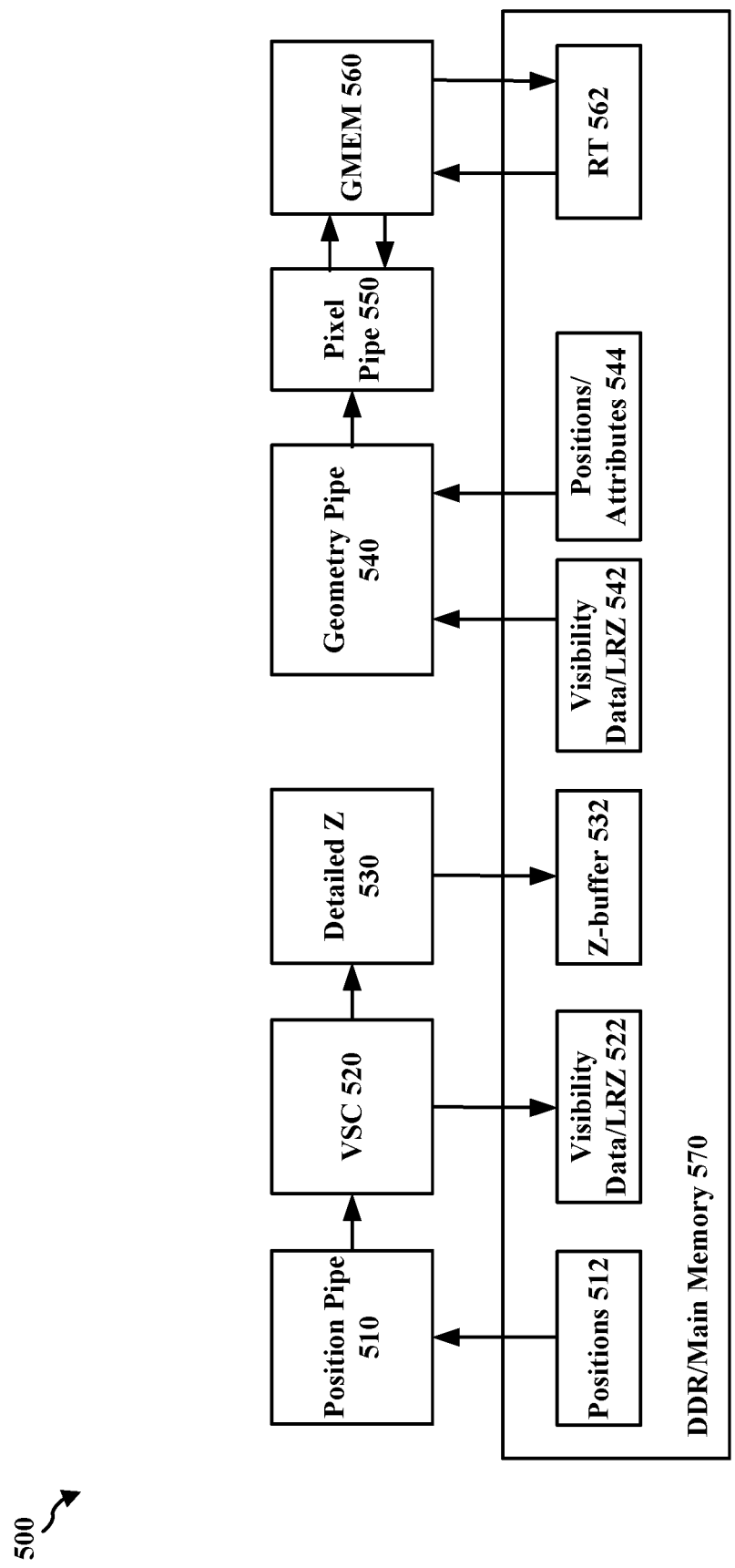
FIG. 5 is a diagram illustrating an example GPU architecture in accordance with one or more techniques of this disclosure.

FIG. 5 is a diagram 500 illustrating an example GPU architecture. As shown in FIG. 5, diagram 500 includes position pipe 510, positions 512, vertex shader control (VSC) 520, visibility data and low resolution Z pass (LRZ) 522, per-sample depth interpolation and test block (detailed Z) 530, and depth buffer (Z-buffer) 532. Each of these components 510-532 may be associated with a binning pipe of the GPU. Additionally, diagram 500 includes geometry pipe 540, visibility data/LRZ 542, positions/attributes 544, pixel pipe 550, GPU memory (GMEM) 560, and render target (RT) 562. Each of these components 540-562 may be associated with a rendering pipe or geometry pipe of the GPU. Also, the binning pipe and/or geometry pipe may be associated with sorting primitives into tiles or more bins. Further, a number of these components may correspond to a double data rate (DDR) memory or a main memory 570. For instance, positions 512, visibility data/LRZ 522, Z-buffer 532, visibility data/LRZ 542, positions/attributes 544, and RT 562 may correspond to the DDR or main memory 570.

As shown in FIG. 5, aspects of the present disclosure may configure a binning pipe of the GPU to include a per-sample depth interpolation and test block (detailed Z), e.g., detailed Z 530. The per-sample depth interpolation and test block (detailed Z 530) may be associated with producing per-sample depth information, performing of a depth test, and/or writing a final depth value to a depth buffer. Additionally, the per-sample depth interpolation and test block (detailed Z 530) may be associated with a depth buffer (Z-buffer), e.g., Z-buffer 532. That is, aspects of the present disclosure may also configure the binning pipe of the GPU to include the depth buffer or Z-buffer 532. By configuring the binning pipe of the GPU to include the detailed Z 530 and the Z-buffer 532, aspects of the present disclosure may allow depth passes to process through the binning pipe concurrently with pixel shading processing. As such, aspects of the present disclosure may reduce or eliminate the time necessary to process depth passes at the GPU, thereby improving the GPU performance or processing speed.

As depicted in FIG. 5, aspects of the present disclosure may configure a portion of a GPU, e.g., a binning pipe or geometry pipe, to include at least one depth processing block or a per-sample depth interpolation and test block (detailed Z 530), which may be associated with at least one depth buffer (Z-buffer 532 in DDR or main memory 570). Aspects of the present disclosure may also generate the at least one depth buffer (Z-buffer 532) that is associated with one or more depth passes, where the at least one depth buffer (Z-buffer 532) is generated as an output of the depth passes. After receiving multiple graphics workloads, aspects of the present disclosure may identify the depth passes for the graphics workloads, where the graphics workloads are associated with multiple frames of a scene. Further, aspects of the present disclosure may process the one or more depth passes in the portion of the GPU, e.g., binning pipe or geometry pipe 540, including the at least one depth processing block (detailed Z 530), where each of the depth passes may be processed by the at least one depth processing block (detailed Z 530). Additionally, after processing the depth passes, aspects of the present disclosure may transmit the depth passes to a render GPU pipe or a rendering pipe of the GPU. After doing so, aspects of the present disclosure may combine each of the depth passes with at least one other GPU operation. Moreover, aspects of the present disclosure may generate a final frame or a final render target (RT 562) based on the depth passes and the at least one other GPU operation.

Aspects of the present disclosure may include a number of benefits or advantages. For instance, aspects of the present disclosure may improve the GPU performance, such as by increasing the processing speed of the GPU. Aspects of the present disclosure may also run several applications simultaneously or concurrently, which may reduce the amount of time the GPU spends to process certain applications. More specifically, a processing time for a depth pass of some surfaces may occur concurrently with a processing time for a render pass of other surfaces. Accordingly, aspects of the present disclosure may process depth passes simultaneously with render passes, which is in contrast to other GPU approaches that may process depth passes separately from render passes. Therefore, aspects of the present disclosure may reduce or eliminate the time necessary to process certain information at a GPU, e.g., depth passes.

Figure 6:
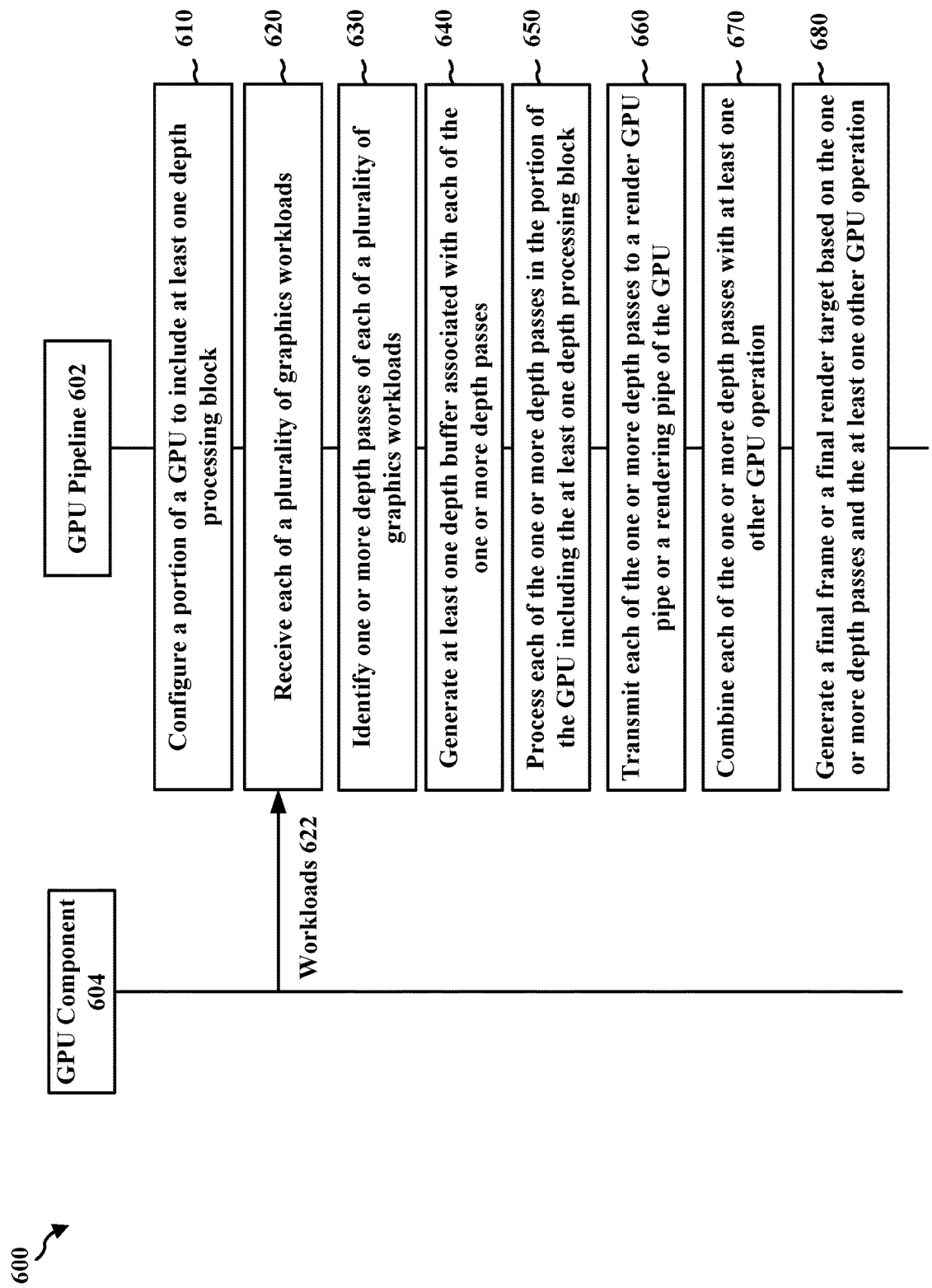
FIG. 6 is a communication flow diagram illustrating example communications between a GPU pipeline and a GPU component in accordance with one or more techniques of this disclosure.

FIG. 6 is a communication flow diagram 600 of graphics processing in accordance with one or more techniques of this disclosure. As shown in FIG. 6, diagram 600 includes example communications between GPU pipeline 602 and GPU component 604 (e.g., another component in a GPU pipeline), in accordance with one or more techniques of this disclosure.

At 610, GPU pipeline 602 may configure a portion of a graphics processing unit (GPU) to include at least one depth processing block, the at least one depth processing block being associated with at least one depth buffer.

In some aspects, the portion of the GPU may correspond to at least one of a binning pipe or a geometry pipe. Also, at least one of the binning pipe or the geometry pipe may be associated with sorting one or more primitives into one or more tiles or one or more bins. In some aspects, the at least one depth processing block may be a per-sample depth interpolation and test block. The per-sample depth interpolation and test block may be associated with at least one of producing per-sample depth information, performing of a depth test, or writing a final depth value to a depth buffer. Further, the at least one depth processing block may produce the at least one depth buffer.

At 620, GPU pipeline 602 may receive each of a plurality of graphics workloads, e.g., workloads 622, where one or more depth passes of each of the plurality of graphics workloads are identified after each of the plurality of graphics workloads is received. As shown in FIG. 6, the workloads 622 may be received by GPU pipeline 602 from GPU component 604.

At 630, GPU pipeline 602 may identify one or more depth passes of each of a plurality of graphics workloads, the plurality of graphics workloads being associated with a plurality of frames. The plurality of frames may correspond to at least one scene that is processed at the GPU. Each of the plurality of frames may correspond to one or more surfaces, and at least one of the one or more surfaces may be associated with the one or more depth passes.

At 640, GPU pipeline 602 may generate the at least one depth buffer, where the generation of the at least one depth buffer is associated with each of the one or more depth passes. The at least one depth buffer may be generated as an output of each of the one or more depth passes. Also, the at least one depth buffer may correspond to a portion of at least one of a GPU memory (GMEM), a double data rate (DDR) memory, or a main memory.

At 650, GPU pipeline 602 may process each of the one or more depth passes in the portion of the GPU including the at least one depth processing block, each of the one or more depth passes being processed by the at least one depth processing block, the one or more depth passes being associated with the at least one depth buffer. Each of the one or more depth passes may be processed concurrently with a render pass.

At 660, GPU pipeline 602 may transmit, upon processing each of the one or more depth passes, each of the one or more depth passes to a render GPU pipe or a rendering pipe of the GPU.

At 670, GPU pipeline 602 may combine, upon transmitting each of the one or more depth passes, each of the one or more depth passes with at least one other GPU operation.

At 680, GPU pipeline 602 may generate, upon combining each of the one or more depth passes with the at least one other GPU operation, a final frame or a final render target based on the one or more depth passes and the at least one other GPU operation.

Figure 7:
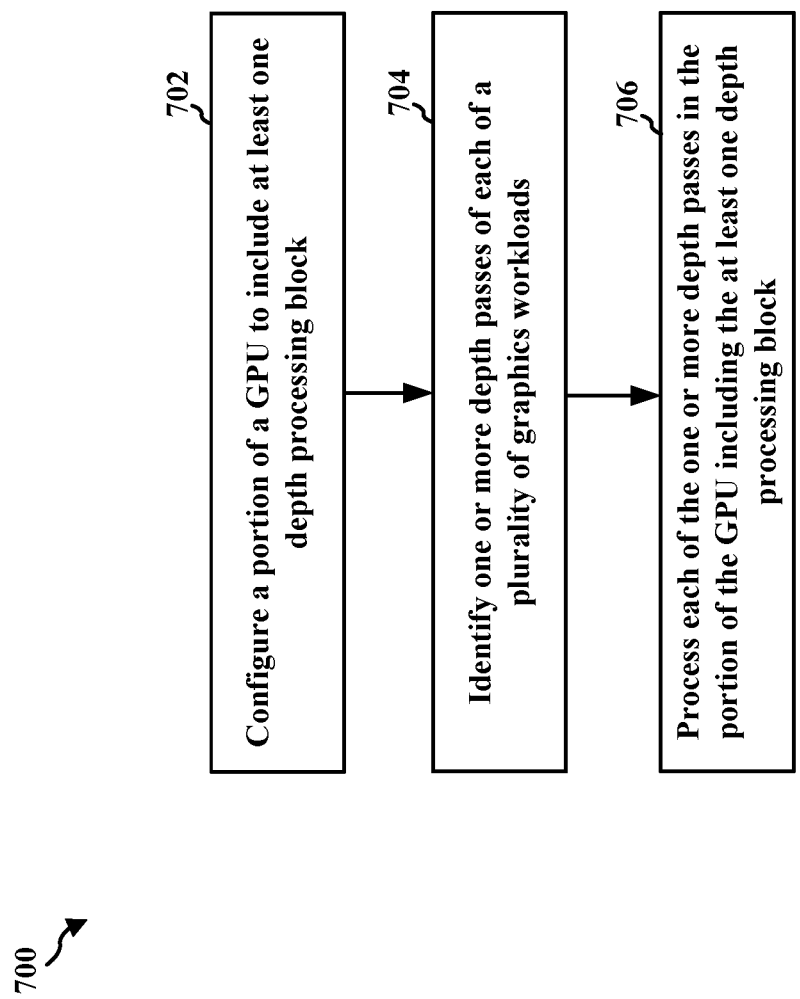
FIG. 7 is a flowchart of an example method of graphics processing in accordance with one or more techniques of this disclosure.

FIG. 7 is a flowchart 700 of an example method of graphics processing in accordance with one or more techniques of this disclosure. The method may be performed by an apparatus, such as an apparatus for graphics processing, a GPU, another graphics processor, a GPU pipeline, a wireless communication device, and/or any apparatus that can perform graphics processing as used in connection with the examples of FIGS. 1-6.

At 702, the apparatus may configure a portion of a graphics processing unit (GPU) to include at least one depth processing block, the at least one depth processing block being associated with at least one depth buffer, as described in connection with the examples of FIGS. 1-6. For example, as described in 610 of FIG. 6, GPU pipeline 602 may configure a portion of a graphics processing unit (GPU) to include at least one depth processing block, the at least one depth processing block being associated with at least one depth buffer. Further, processing unit 120 in FIG. 1 may perform step 702.

In some aspects, the portion of the GPU may correspond to at least one of a binning pipe or a geometry pipe. Also, at least one of the binning pipe or the geometry pipe may be associated with sorting one or more primitives into one or more tiles or one or more bins. In some aspects, the at least one depth processing block may be a per-sample depth interpolation and test block. The per-sample depth interpolation and test block may be associated with at least one of producing per-sample depth information, performing of a depth test, or writing a final depth value to a depth buffer. Further, the at least one depth processing block may produce the at least one depth buffer.

At 704, the apparatus may identify one or more depth passes of each of a plurality of graphics workloads, the plurality of graphics workloads being associated with a plurality of frames, as described in connection with the examples of FIGS. 1-6. For example, as described in 630 of FIG. 6, GPU pipeline 602 may identify one or more depth passes of each of a plurality of graphics workloads, the plurality of graphics workloads being associated with a plurality of frames. Further, processing unit 120 in FIG. 1 may perform step 704. The plurality of frames may correspond to at least one scene that is processed at the GPU. Each of the plurality of frames may correspond to one or more surfaces, and at least one of the one or more surfaces may be associated with the one or more depth passes.

At 706, the apparatus may process each of the one or more depth passes in the portion of the GPU including the at least one depth processing block, each of the one or more depth passes being processed by the at least one depth processing block, the one or more depth passes being associated with the at least one depth buffer, as described in connection with the examples of FIGS. 1-6. For example, as described in 650 of FIG. 6, GPU pipeline 602 may process each of the one or more depth passes in the portion of the GPU including the at least one depth processing block, each of the one or more depth passes being processed by the at least one depth processing block, the one or more depth passes being associated with the at least one depth buffer. Further, processing unit 120 in FIG. 1 may perform step 706. Each of the one or more depth passes may be processed concurrently with a render pass.

Figure 8:
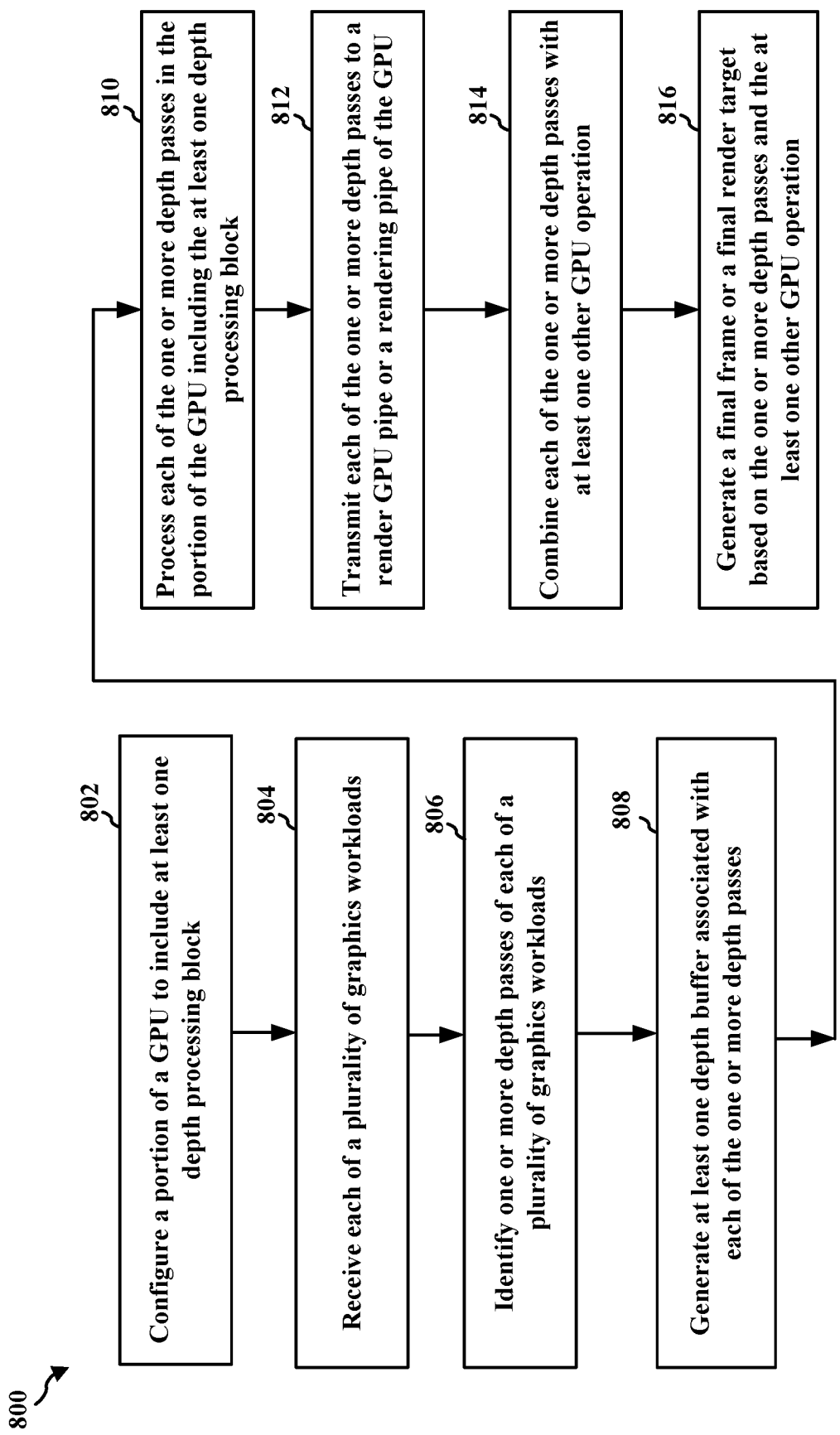
FIG. 8 is a flowchart of an example method of graphics processing in accordance with one or more techniques of this disclosure.

FIG. 8 is a flowchart 800 of an example method of graphics processing in accordance with one or more techniques of this disclosure. The method may be performed by an apparatus, such as an apparatus for graphics processing, a GPU, another graphics processor, a GPU pipeline, a wireless communication device, and/or any apparatus that can perform graphics processing as used in connection with the examples of FIGS. 1-6.

At 802, the apparatus may configure a portion of a graphics processing unit (GPU) to include at least one depth processing block, the at least one depth processing block being associated with at least one depth buffer, as described in connection with the examples of FIGS. 1-6. For example, as described in 610 of FIG. 6, GPU pipeline 602 may configure a portion of a graphics processing unit (GPU) to include at least one depth processing block, the at least one depth processing block being associated with at least one depth buffer. Further, processing unit 120 in FIG. 1 may perform step 802.

In some aspects, the portion of the GPU may correspond to at least one of a binning pipe or a geometry pipe. Also, at least one of the binning pipe or the geometry pipe may be associated with sorting one or more primitives into one or more tiles or one or more bins. In some aspects, the at least one depth processing block may be a per-sample depth interpolation and test block. The per-sample depth interpolation and test block may be associated with at least one of producing per-sample depth information, performing of a depth test, or writing a final depth value to a depth buffer. Further, the at least one depth processing block may produce the at least one depth buffer.

At 804, the apparatus may receive each of a plurality of graphics workloads, where one or more depth passes of each of the plurality of graphics workloads are identified after each of the plurality of graphics workloads is received, as described in connection with the examples of FIGS. 1-6. For example, as described in 620 of FIG. 6, GPU pipeline 602 may receive each of a plurality of graphics workloads, where one or more depth passes of each of the plurality of graphics workloads are identified after each of the plurality of graphics workloads is received. Further, processing unit 120 in FIG. 1 may perform step 804.

At 806, the apparatus may identify one or more depth passes of each of a plurality of graphics workloads, the plurality of graphics workloads being associated with a plurality of frames, as described in connection with the examples of FIGS. 1-6. For example, as described in 630 of FIG. 6, GPU pipeline 602 may identify one or more depth passes of each of a plurality of graphics workloads, the plurality of graphics workloads being associated with a plurality of frames. Further, processing unit 120 in FIG. 1 may perform step 806. The plurality of frames may correspond to at least one scene that is processed at the GPU. Each of the plurality of frames may correspond to one or more surfaces, and at least one of the one or more surfaces may be associated with the one or more depth passes.

At 808, the apparatus may generate the at least one depth buffer, where the generation of the at least one depth buffer is associated with each of the one or more depth passes, as described in connection with the examples of FIGS. 1-6. For example, as described in 640 of FIG. 6, GPU pipeline 602 may generate the at least one depth buffer, where the generation of the at least one depth buffer is associated with each of the one or more depth passes. Further, processing unit 120 in FIG. 1 may perform step 808. The at least one depth buffer may be generated as an output of each of the one or more depth passes. Also, the at least one depth buffer may correspond to a portion of at least one of a GPU memory (GMEM), a double data rate (DDR) memory, or a main memory.

At 810, the apparatus may process each of the one or more depth passes in the portion of the GPU including the at least one depth processing block, each of the one or more depth passes being processed by the at least one depth processing block, the one or more depth passes being associated with the at least one depth buffer, as described in connection with the examples of FIGS. 1-6. For example, as described in 650 of FIG. 6, GPU pipeline 602 may process each of the one or more depth passes in the portion of the GPU including the at least one depth processing block, each of the one or more depth passes being processed by the at least one depth processing block, the one or more depth passes being associated with the at least one depth buffer. Further, processing unit 120 in FIG. 1 may perform step 810. Each of the one or more depth passes may be processed concurrently with a render pass.

At 812, the apparatus may transmit, upon processing each of the one or more depth passes, each of the one or more depth passes to a render GPU pipe or a rendering pipe of the GPU, as described in connection with the examples of FIGS. 1-6. For example, as described in 660 of FIG. 6, GPU pipeline 602 may transmit, upon processing each of the one or more depth passes, each of the one or more depth passes to a render GPU pipe or a rendering pipe of the GPU. Further, processing unit 120 in FIG. 1 may perform step 812.

At 814, the apparatus may combine, upon transmitting each of the one or more depth passes, each of the one or more depth passes with at least one other GPU operation, as described in connection with the examples of FIGS. 1-6. For example, as described in 670 of FIG. 6, GPU pipeline 602 may combine, upon transmitting each of the one or more depth passes, each of the one or more depth passes with at least one other GPU operation. Further, processing unit 120 in FIG. 1 may perform step 814.

At 816, the apparatus may generate, upon combining each of the one or more depth passes with the at least one other GPU operation, a final frame or a final render target based on the one or more depth passes and the at least one other GPU operation, as described in connection with the examples of FIGS. 1-6. For example, as described in 680 of FIG. 6, GPU pipeline 602 may generate, upon combining each of the one or more depth passes with the at least one other GPU operation, a final frame or a final render target based on the one or more depth passes and the at least one other GPU operation. Further, processing unit 120 in FIG. 1 may perform step 816.

In configurations, a method or an apparatus for graphics processing is provided. The apparatus may be a GPU, a graphics processor, or some other processor that may perform graphics processing. In aspects, the apparatus may be the processing unit 120 within the device 104, or may be some other hardware within the device 104 or another device. The apparatus, e.g., processing unit 120, may include means for configuring a portion of a graphics processing unit (GPU) to include at least one depth processing block, the at least one depth processing block being associated with at least one depth buffer, the portion of the GPU corresponding to at least one of a binning pipe or a geometry pipe; means for identifying one or more depth passes of each of a plurality of graphics workloads, the plurality of graphics workloads being associated with a plurality of frames; means for processing each of the one or more depth passes in the portion of the GPU including the at least one depth processing block, each of the one or more depth passes being processed by the at least one depth processing block, the one or more depth passes being associated with the at least one depth buffer; means for generating the at least one depth buffer, where the generation of the at least one depth buffer is associated with each of the one or more depth passes; means for transmitting, upon processing each of the one or more depth passes, each of the one or more depth passes to a render GPU pipe or a rendering pipe of the GPU; means for combining, upon transmitting each of the one or more depth passes, each of the one or more depth passes with at least one other GPU operation; means for generating, upon combining each of the one or more depth passes with the at least one other GPU operation, a final frame or a final render target based on the one or more depth passes and the at least one other GPU operation; and means for receiving each of the plurality of graphics workloads, where the one or more depth passes of each of the plurality of graphics workloads are identified after each of the plurality of graphics workloads is received.

The subject matter described herein can be implemented to realize one or more benefits or advantages. For instance, the described graphics processing techniques can be used by a GPU, a graphics processor, or some other processor that can perform graphics processing to implement the depth and shadow pass optimization techniques for tile based GPU architectures described herein. This can also be accomplished at a low cost compared to other graphics processing techniques. Moreover, the graphics processing techniques herein can improve or speed up data processing or execution. Further, the graphics processing techniques herein can improve resource or data utilization and/or resource efficiency. Additionally, aspects of the present disclosure can utilize depth and shadow pass optimization techniques for tile based GPU architectures in order to improve memory bandwidth efficiency and/or increase processing speed at a GPU.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

In accordance with this disclosure, the term "or" may be interpreted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques may be fully implemented in one or more circuits or logic elements.

The following aspects are illustrative only and may be combined with other aspects or teachings described herein, without limitation.

Aspect 1 is an apparatus for graphics processing, including a memory and at least one processor coupled to the memory and configured to: configure a portion of a graphics processing unit (GPU) to include at least one depth processing block, the at least one depth processing block being associated with at least one depth buffer; identify one or more depth passes of each of a plurality of graphics workloads, the plurality of graphics workloads being associated with a plurality of frames; and process each of the one or more depth passes in the portion of the GPU including the at least one depth processing block, each of the one or more depth passes being processed by the at least one depth processing block, the one or more depth passes being associated with the at least one depth buffer.

Aspect 2 is the apparatus of aspect 1, where the at least one processor is further configured to: generate the at least one depth buffer, where the generation of the at least one depth buffer is associated with each of the one or more depth passes.

Aspect 3 is the apparatus of any of aspects 1 and 2, where the at least one depth buffer is generated as an output of each of the one or more depth passes.

Aspect 4 is the apparatus of any of aspects 1 to 3, where the portion of the GPU corresponds to at least one of a binning pipe or a geometry pipe.

Aspect 5 is the apparatus of any of aspects 1 to 4, where at least one of the binning pipe or the geometry pipe is associated with sorting one or more primitives into one or more tiles or one or more bins.

Aspect 6 is the method of any of aspects 1 to 5, where each of the plurality of frames corresponds to one or more surfaces, and where at least one of the one or more surfaces is associated with the one or more depth passes.

Aspect 7 is the method of any of aspects 1 to 6, where the at least one depth processing block is a per-sample depth interpolation and test block.

Aspect 8 is the method of any of aspects 1 to 7, where the per-sample depth interpolation and test block is associated with at least one of producing per-sample depth information, performing of a depth test, or writing a final depth value to a depth buffer.

Aspect 9 is the method of any of aspects 1 to 8, where the at least one processor is further configured to: transmit, upon processing each of the one or more depth passes, each of the one or more depth passes to a render GPU pipe or a rendering pipe of the GPU.

Aspect 10 is the method of any of aspects 1 to 9, where the at least one processor is further configured to: combine, upon transmitting each of the one or more depth passes, each of the one or more depth passes with at least one other GPU operation.

Aspect 11 is the method of any of aspects 1 to 10, where the at least one processor is further configured to: generate, upon combining each of the one or more depth passes with the at least one other GPU operation, a final frame or a final render target based t one other GPU operation, a final frame or a final render target based on the one or more depth passes and the at least one other GPU operation.

Aspect 12 is the method of any of aspects 1 to 11, where the at least one processor is further configured to: receive each of the plurality of graphics workloads, where the one or more depth passes of each of the plurality of graphics workloads are identified after each of the plurality of graphics workloads is received.

Aspect 13 is the method of any of aspects 1 to 12, where the at least one depth processing block produces the at least one depth buffer.

Aspect 14 is the method of any of aspects 1 to 13, where each of the one or more depth passes is processed concurrently with a render pass.

Aspect 15 is the method of any of aspects 1 to 14, where the plurality of frames corresponds to at least one scene that is processed at the GPU.

Aspect 16 is the method of any of aspects 1 to 15, where the at least one depth buffer corresponds to a portion of at least one of a GPU memory (GMEM), a double data rate (DDR) memory, or a main memory.

Aspect 17 is the method of any of aspects 1 to 16, further including a transceiver coupled to the at least one processor.

Aspect 18 is a method of graphics processing for implementing any of aspects 1 to 17.

Aspect 19 is an apparatus for graphics processing including means for implementing any of aspects 1 to 17.

Aspect 20 is a computer-readable medium storing computer executable code, the code when executed by at least one processor causes the at least one processor to implement any of aspects 1 to 17.

What is claimed is:
1. An apparatus for graphics processing, comprising:
a memory; and
at least one processor coupled to the memory and configured to:
configure a portion of a graphics processing unit (GPU) to include at least one depth processing block, the at least one depth processing block being associated with at least one depth buffer, the portion of the GPU corresponding to at least one of a binning pipe or a geometry pipe;
identify one or more depth passes of each of a plurality of graphics workloads, the plurality of graphics workloads being associated with a plurality of frames;
process each of the one or more depth passes in the portion of the GPU including the at least one depth processing block, each of the one or more depth passes being processed by the at least one depth processing block, the one or more depth passes being associated with the at least one depth buffer;
transmit, upon processing each of the one or more depth passes, each of the one or more depth passes to a render GPU pipe or a rendering pipe of the GPU;
combine, upon transmitting each of the one or more depth passes, each of the one or more depth passes with at least one other GPU operation; and
generate, upon combining each of the one or more depth passes with the at least one other GPU operation, a final frame or a final render target based on the one or more depth passes and the at least one other GPU operation,
wherein each of the one or more depth passes is processed concurrently with pixel shading and a render pass to improve GPU performance or processing speed, and
wherein at least one of the binning pipe or the geometry pipe is associated with sorting one or more primitives into one or more tiles or one or more bins.

2. The apparatus of claim 1, wherein the at least one processor is further configured to:
generate the at least one depth buffer, wherein the generation of the at least one depth buffer is associated with each of the one or more depth passes.

3. The apparatus of claim 2, wherein the at least one depth buffer is generated as an output of each of the one or more depth passes.

4. The apparatus of claim 1, wherein each of the plurality of frames corresponds to one or more surfaces, and wherein at least one of the one or more surfaces is associated with the one or more depth passes.

5. The apparatus of claim 1, wherein the at least one depth processing block is a per-sample depth interpolation and test block.

6. The apparatus of claim 5, wherein the per-sample depth interpolation and test block is associated with at least one of producing per-sample depth information, performing of a depth test, or writing a final depth value to a depth buffer.

7. The apparatus of claim 1, wherein the at least one processor is further configured to:
receive each of the plurality of graphics workloads, wherein the one or more depth passes of each of the plurality of graphics workloads are identified after each of the plurality of graphics workloads is received.

8. The apparatus of claim 1, wherein the at least one depth processing block produces the at least one depth buffer.

9. The apparatus of claim 1, wherein the plurality of frames corresponds to at least one scene that is processed at the GPU.

10. The apparatus of claim 1, wherein the at least one depth buffer corresponds to a portion of at least one of a GPU memory (GMEM), a double data rate (DDR) memory, or a main memory.

11. The apparatus of claim 1, further comprising a transceiver coupled to the at least one processor.

12. A method of graphics processing, comprising:
configuring a portion of a graphics processing unit (GPU) to include at least one depth processing block, the at least one depth processing block being associated with at least one depth buffer, the portion of the GPU corresponding to at least, one of a binning pipe or a geometry pipe;
identifying one or more depth passes of each of a plurality of graphics workloads, the plurality of graphics workloads being associated with a plurality of frames;
processing each of the one or more depth passes in the portion of the GPU including the at least one depth processing block, each of the one or more depth passes being processed by the at least one depth processing block, the one or more depth passes being associated with the at least one depth buffer;
transmitting, upon processing each of the one or more depth passes, each of the one or more depth passes to a render GPU pipe or a rendering pipe of the GPU;
combining, upon transmitting each of the one or more depth passes, each of the one or more depth passes with at least one other GPU operation; and
generating, upon combining each of the one or more depth passes with the at least one other GPU operation, a final frame or a final render target based on the one or more depth passes and the at least one other GPU operation,
wherein each of the one or more depth passes is processed concurrently with pixel shading and a render pass to improve GPU performance or processing speed, and wherein at least one of the binning pipe or the geometry pipe is associated with sorting one or more primitives into one or more tiles or one or more bins.

13. The method of claim 12, further comprising:
generating the at least one depth buffer, wherein the generation of the at least one depth buffer is associated with each of the one or more depth passes.

14. The method of claim 13, wherein the at least one depth buffer is generated as an output of each of the one or more depth passes.

15. The method of claim 12, wherein each of the plurality of frames corresponds to one or more surfaces, and wherein at least one of the one or more surfaces is associated with the one or more depth passes.

16. The method of claim 12, wherein the at least one depth processing block is a per-sample depth interpolation and test block.

17. The method of claim 16, wherein the per-sample depth interpolation and test block is associated with at least one of producing per-sample depth information, performing of a depth test, or writing a final depth value to a depth buffer.

18. The method of claim 12, further comprising:
receiving each of the plurality of graphics workloads, wherein the one or more depth passes of each of the plurality of graphics workloads are identified after each of the plurality of graphics workloads is received.

19. The method of claim 12, wherein the at least one depth processing block produces the at least one depth buffer.

20. The method of claim 12, wherein the plurality of frames corresponds to at least one scene that is processed at the GPU.

21. The method of claim 12, wherein the at least one depth buffer corresponds to a portion of at least one of a GPU memory (GMEM), a double data rate (DDR) memory, or a main memory.

22. An apparatus for graphics processing, comprising:
means for configuring a portion of a graphics processing unit (GPU) to include at least one depth processing block, the at least one depth processing block being associated with at least one depth buffer, the portion of the GPU corresponding to at least one of a binning pipe or a geometry pipe;
means for identifying one or more depth passes of each of a plurality of graphics workloads, the plurality of graphics workloads being associated with a plurality of frames;
means for processing each of the one or more depth passes in the portion of the GPU including the at least one depth processing block, each of the one or more depth passes being processed by the at least one depth processing block, the one or more depth passes being associated with the at least one depth buffer; and
means for transmitting, upon processing each of the one or more depth passes, each of the one or more depth passes to a render GPU pipe or a rendering pipe of the GPU;
means for combining, upon transmitting each of the one or more depth passes, each of the one or more depth passes with at least one other GPU operation; and
means for generating, upon combining each of the one or more depth passes with the at least one other GPU operation, a final frame or a final render target based on the one or more depth passes and the at least one other GPU operation,
wherein each of the one or more depth passes is processed concurrently with pixel shading and a render pass to improve GPU performance or processing speed, and
wherein at least one of the binning pipe or the geometry pipe is associated with sorting one or more primitives into one or more tiles or one or more bins.

23. A computer-readable medium storing computer executable code for graphics processing, the code when executed by a processor causes the processor to:
configure a portion of a graphics processing unit (GPU) to include at least one depth processing block, the at least one depth processing block being associated with at least one depth buffer, the portion of the GPU corresponding to at least one of a binning pipe or a geometry pipe;
identify one or more depth passes of each of a plurality of graphics workloads, the plurality of graphics workloads being associated with a plurality of frames;
process each of the one or more depth passes in the portion of the GPU including the at least one depth processing block, each of the one or more depth passes being processed by the at least one depth processing block, the one or more depth passes being associated with the at least one depth buffer; and
transmit, upon processing each of the one or more depth passes, each of the one or more depth passes to a render GPU pipe or a rendering pipe of the GPU;
combine, upon transmitting each of the one or more depth passes, each of the one or more depth passes with at least one other GPU operation; and
generate, upon combining each of the one or more depth passes with the at least one other GPU operation, a final frame or a final render target based on the one or more depth passes and the at least one other GPU operation,
wherein each of the one or more depth passes is processed concurrently with pixel shading and a render pass to improve GPU performance or processing speed, and
wherein at least one of the binning pipe or the geometry pipe is associated with sorting one or more primitives into one or more tiles or one or more bins.

* * * * *